(12) United States Patent
Imai

(10) Patent No.: US 8,112,579 B2
(45) Date of Patent: Feb. 7, 2012

(54) SELECTING A DESTINATION TAPE RECORDING DEVICE FOR SAVING DATA

(75) Inventor: Naoki Imai, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 12/246,024

(22) Filed: Oct. 6, 2008

(65) Prior Publication Data

US 2009/0040648 A1    Feb. 12, 2009

(51) Int. Cl.
*G06F 12/00* (2006.01)
(52) U.S. Cl. ........................................ 711/111; 711/171
(58) Field of Classification Search .................. None
See application file for complete search history.

(56) References Cited

U.S. PATENT DOCUMENTS

| | | | | |
|---|---|---|---|---|
| 7,073,036 | B2 * | 7/2006 | Furuya et al. | 711/162 |
| 7,392,356 | B1 * | 6/2008 | Hardman | 711/162 |
| 7,444,467 | B2 * | 10/2008 | Ninomiya et al. | 711/113 |

FOREIGN PATENT DOCUMENTS

| | | |
|---|---|---|
| JP | 2003296152 A | 10/2003 |
| JP | 2004-355748 | 12/2004 |
| JP | 2005-044357 | 2/2005 |
| JP | 2006004011 A1 | 1/2006 |

\* cited by examiner

*Primary Examiner* — Sanjiv Shah
*Assistant Examiner* — Daniel Tsui
(74) *Attorney, Agent, or Firm* — Richard M. Kotulak

(57) ABSTRACT

Selecting a destination tape recording device, out of a plurality of tape recording devices, for saving data. Particularly a technique for selecting a tape recording apparatus whose performance is optimal for data to be saved, thereby improving data backup performance in a plurality of tape recording apparatuses.

18 Claims, 7 Drawing Sheets

[Figure 1]
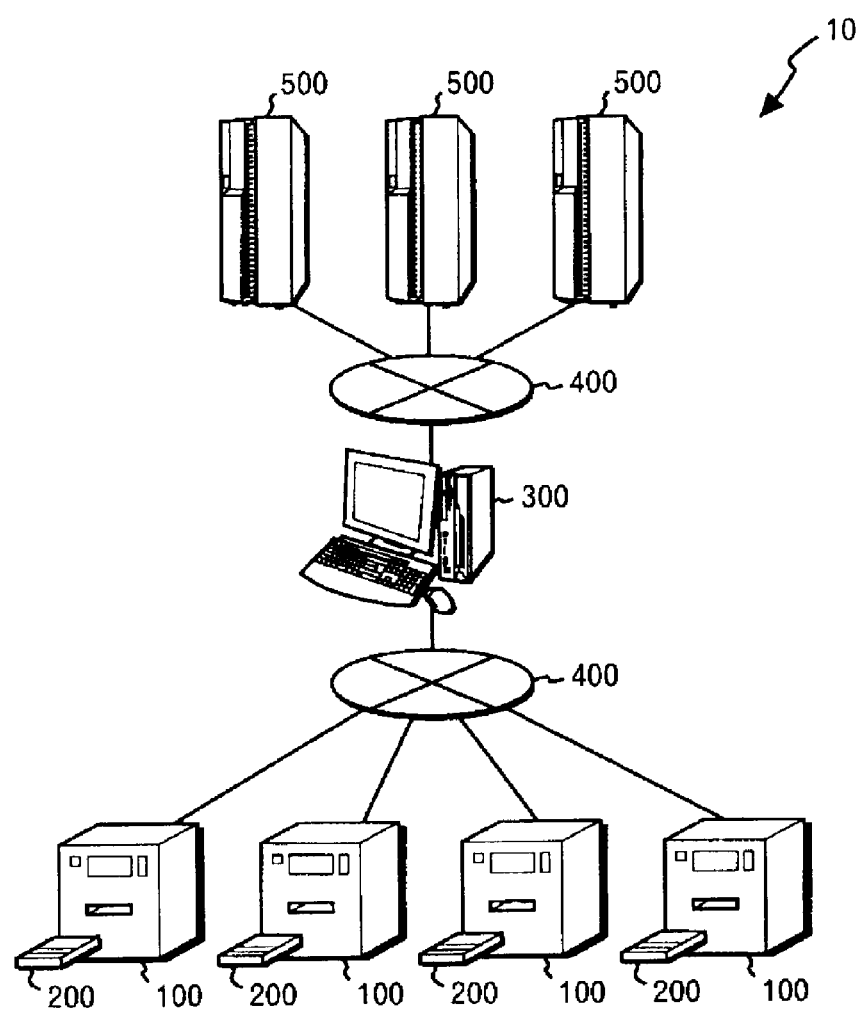

[Figure 2]

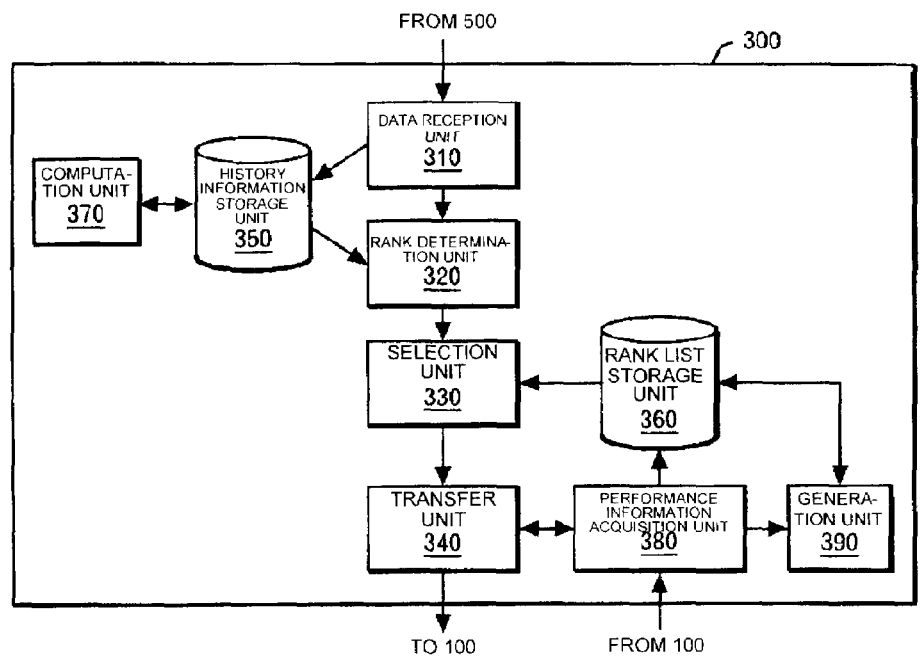

| STANDARD SCORE | FROM 25 TO 30 | FROM 31 TO 34 | FROM 35 TO 39 | FROM 40 TO 44 | FROM 45 TO 49 | FROM 50 TO 54 | FROM 55 TO 59 | FROM 60 TO 64 | FROM 65 TO 69 | FROM 70 TO 75 |
|---|---|---|---|---|---|---|---|---|---|---|
| RANK | 10th | 9th | 8th | 7th | 6th | 5th | 4th | 3rd | 2nd | 1st | b)

| DATA VALUE | LESS THAN 50 KBytes | FROM 50 KBytes (INCLUSIVE) TO 100 KBytes | FROM 100 KBytes (INCLUSIVE) TO 500 KBytes | FROM 500 KBytes (INCLUSIVE) TO 1 MByte (EXCLUSIVE) | FROM 1 MByte (INCLUSIVE) TO 10 MBytes | FROM 10 MBytes (INCLUSIVE) TO 50 MBytes | FROM 50 MBytes (INCLUSIVE) TO 100 MBytes | FROM 100 MBytes (INCLUSIVE) TO 500 MBytes | FROM 500 MBytes (INCLUSIVE) TO 1 GByte (EXCLUSIVE) | MORE THAN 1 GByte |
|---|---|---|---|---|---|---|---|---|---|---|
| OCCURRENCE PROBABILITY | 2% | 0% | 15% | 5% | 33% | 2% | 30% | 7% | 5% | 1% |
| RANK | 7th | 10th | 3rd | 5th | 1st | 7th | 2nd | 4th | 5th | 9th |

|  | TAPE MEDIUM a | | | TAPE MEDIUM b | | | |
|---|---|---|---|---|---|---|---|
|  | TRANSFER RATE | ERROR INCI-DENCE | USAGE STATUS | TRANSFER RATE | ERROR INCI-DENCE | USAGE STATUS | ... |
| TAPE RECORDING APPARATUS A | 34 MBytes/sec | 3% | USED | 13 MBytes/sec | 9% | UNUSED | ... |
| TAPE RECORDING APPARATUS B | N/A | N/A | N/A | 14 MBytes/sec | 8% | USED | ... |
| ⋮ | ⋮ | ⋮ | ⋮ | ⋮ | ⋮ | ⋮ | | b)

|  | STANDARD | TYPE | DEFECTIVE AREA |
|---|---|---|---|
| TAPE MEDIUM a | LTO | SECOND GENERATION | ABSENT |
| TAPE MEDIUM b | LTO | FIRST GENERATION | PRESENT |
| ⋮ | ⋮ | ⋮ | ⋮ | c)

|  | RUNNING SPEED (IN UNCOMPRESSED MODE) |
|---|---|
| TAPE RECORDING APPARATUS A | 35 MBytes/sec |
| TAPE RECORDING APPARATUS B | 15 MBytes/sec |
| ⋮ | ⋮ |

| RANK | 1st | 2nd | ... | Mth |
|---|---|---|---|---|
| DATA TRANSFER RATE | 34 MBytes/sec | 33 MBytes/sec | ... | 13 MBytes/sec |
| TAPE RECORDING APPARATUS | APPARATUS A | APPARATUS D | ... | APPARATUS F | b)

| RANK | 1st | 2nd | ... | Mth |
|---|---|---|---|---|
| SUCCESS RATE (1 - ERROR INCIDENCE) | 100% | 97% | ... | 80% |
| TAPE RECORDING APPARATUS | APPARATUS D | APPARATUS A | ... | APPARATUS F | c)

| RANK | 1st | 2nd | ... | Mth |
|---|---|---|---|---|
| SUCCESS RATE * DATA TRANSFER RATE | 3300 | 3298 | ... | 1040 |
| TAPE RECORDING APPARATUS | APPARATUS D | APPARATUS A | ... | APPARATUS F |

[Figure 6]
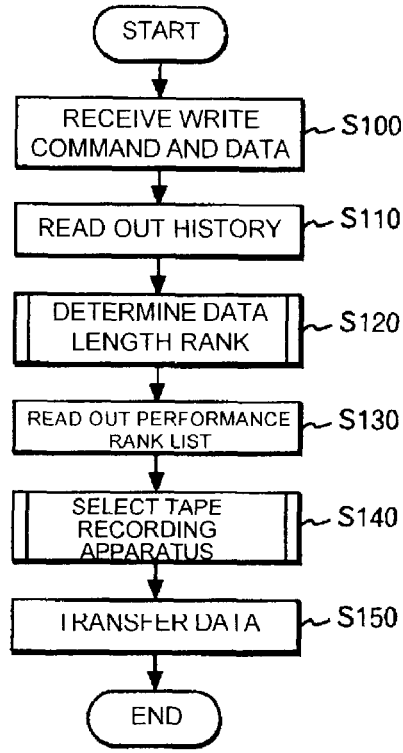
[Figure 7]
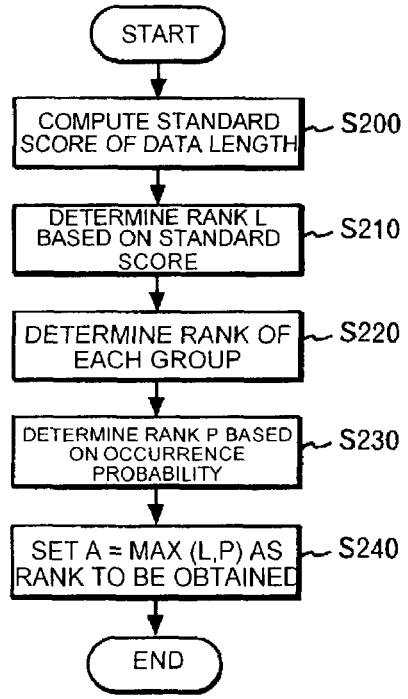

[Figure 8]
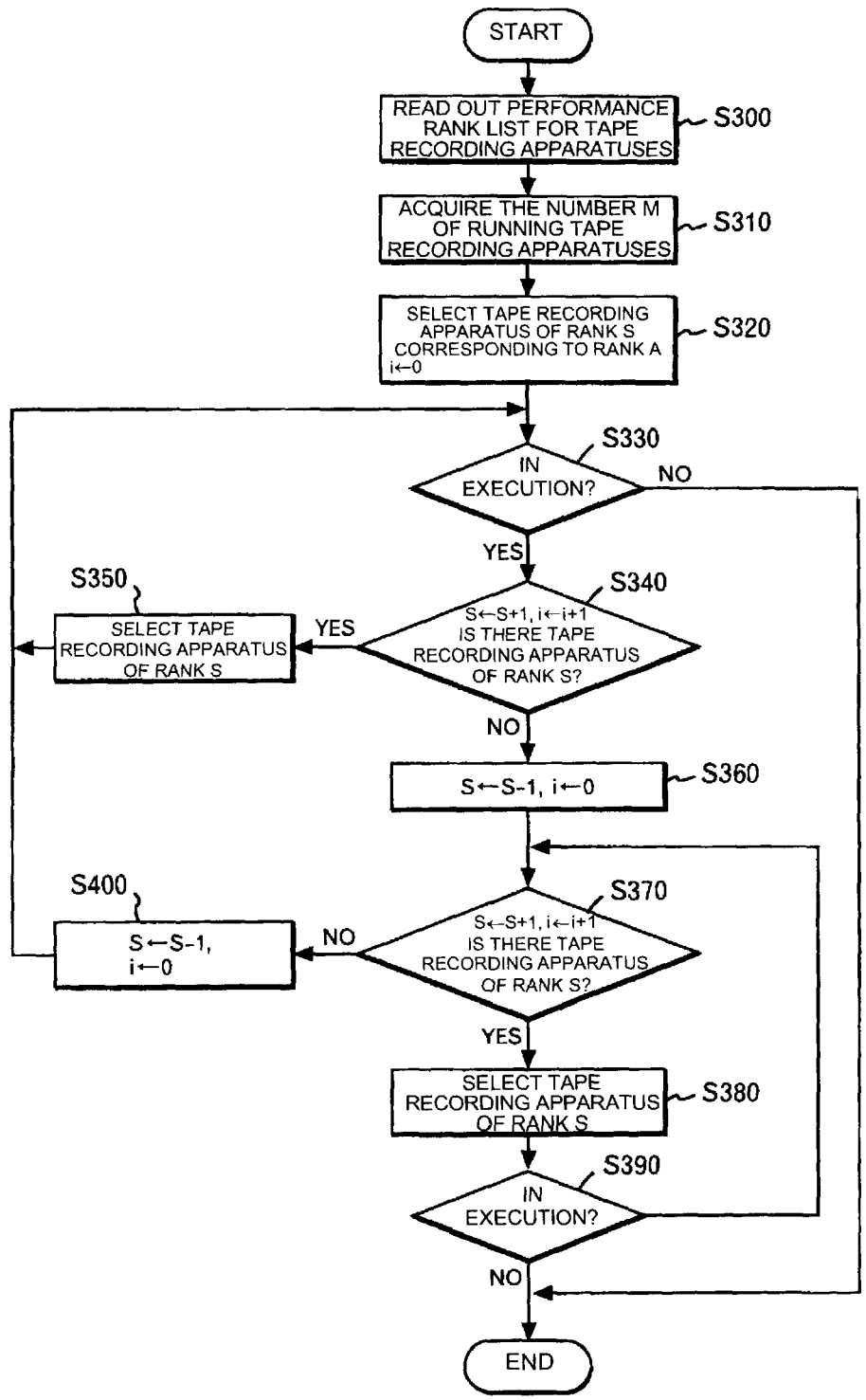

[Figure 9]
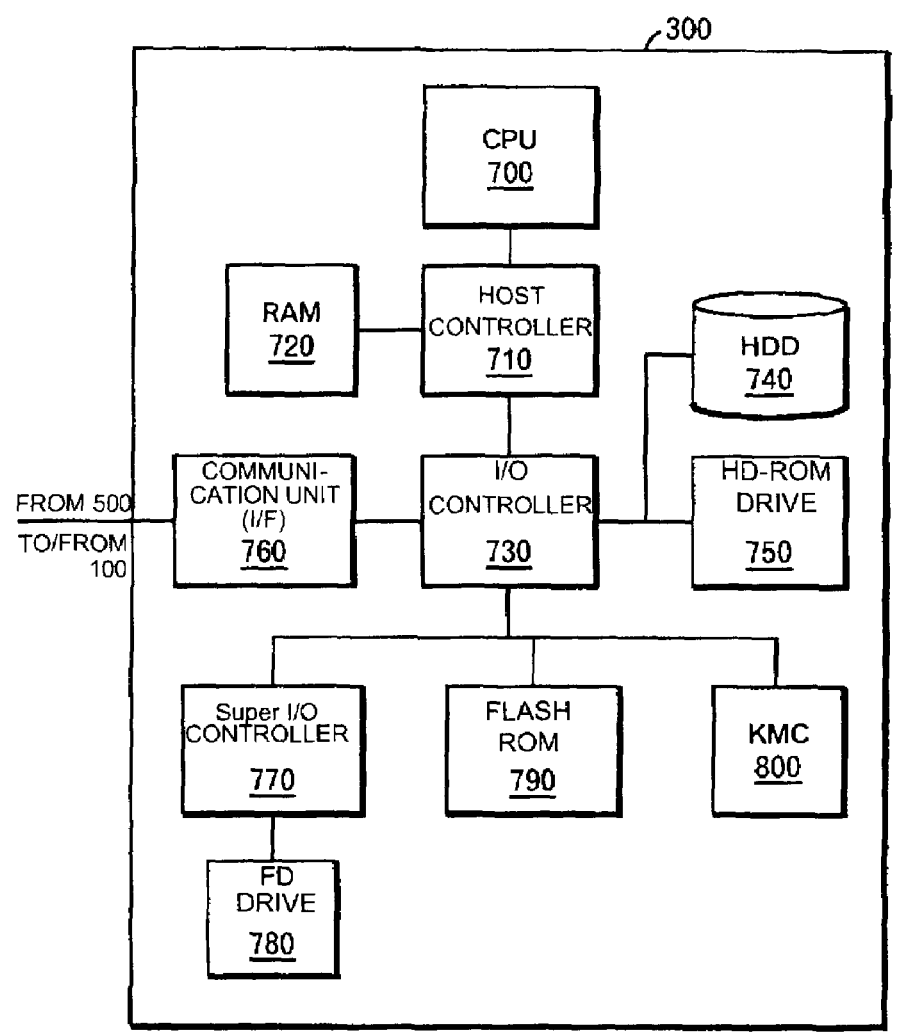

SELECTING A DESTINATION TAPE RECORDING DEVICE FOR SAVING DATA

BACKGROUND

The present invention relates to data saving in a plurality of tape recording apparatuses, and particularly to a technique for selecting a destination tape recording apparatus for saving data transmitted from a host computer out of a plurality of tape recording apparatuses.

Conventionally, when data transmitted from a host computer is to be recorded on a magnetic tape in a system including one or more host computers and a plurality of tape recording apparatuses, a destination tape recording apparatus for saving the data is selected with a simple algorithm that selects an available tape recording apparatus. However, the size of data transmitted from the host computer varies from several KBytes to several tens of MBytes. In addition, the performance of the tape recording apparatuses used varies among the apparatuses. Even if tape recording apparatuses in accordance with the same specification are provided, the performance varies due to secular changes in the apparatuses, not to mention the case where the tape recording apparatuses consist of different types of apparatuses.

SUMMARY

According to one embodiment of the invention, a selection apparatus that selects a destination of data to be saved out of a plurality of tape recording apparatuses is provided, including, a history information storage unit that stores history information about data lengths of past data saved in any of the plurality of tape recording apparatuses; a rank determination unit that determines a data length rank for the data to be saved based on the history information about the data lengths of the past data read out from the history information storage unit; a rank list storage unit that stores a performance rank list for the plurality of tape recording apparatuses; a selection unit that selects a tape recording apparatus for saving the data to be saved out of the plurality of tape recording apparatuses based on the performance rank list read out from the rank list storage unit and the data length rank determined by the rank determination unit so that data saving in the plurality of tape recording apparatuses is performed efficiently as a whole; and a transfer unit that transfers the data to be saved to the tape recording apparatus selected by the selection unit, wherein the rank determination unit ranks the data to be saved high if the data to be saved is judged to have a data length occurring frequently from the history information, and the selection unit selects a tape recording apparatus with a high performance for the high-ranked data to be saved.

According to another embodiment of the invention, a selection apparatus that selects a destination of data to be saved out of a plurality of tape recording apparatuses, is provided including a history information storage unit that stores history information about data lengths of past data saved in any of the plurality of tape recording apparatuses; a rank determination unit that determines a data length rank for the data to be saved based on the history information about the data lengths of the past data read out from the history information storage unit; a rank list storage unit that stores a performance rank list for the plurality of tape recording apparatuses; a selection unit that selects a tape recording apparatus for saving the data to be saved out of the plurality of tape recording apparatuses based on the performance rank list read out from the rank list storage unit and the data length rank determined by the rank determination unit so that data saving in the plurality of tape recording apparatuses is performed efficiently as a whole; and a transfer unit that transfers the data to be saved to the tape recording apparatus selected by the selection unit, wherein the rank determination unit determines a rank determined from the standard score of the data length of the data to be saved and a rank determined from the occurrence probability of the data length of the data to be saved, and identifies the higher rank as the data length rank of the data to be saved.

According to another embodiment of the invention, a method of selecting a destination of data to be saved out of a plurality of tape recording apparatuses in a selection apparatus located between a plurality of host computers and the plurality of tape recording apparatuses, is provided including receiving the data to be saved from one of the plurality of host computers; reading out history information about data lengths of past data saved in any of the plurality of tape recording apparatuses from a history information storage unit; determining a data length rank for the data to be saved based on the history information about the data lengths of the past data; reading out a performance rank list for the plurality of tape recording apparatuses from a rank list storage unit; selecting a tape recording apparatus for saving the data to be saved out of the plurality of tape recording apparatuses based on the performance rank list for the plurality of tape recording apparatuses and the determined data length rank so that data saving in the plurality of tape recording apparatuses is performed efficiently as a whole; and transferring the data to be saved to the selected tape recording apparatus, wherein the data to be saved is ranked high if the data to be saved is judged to have a data length occurring frequently from the history information, and a tape recording apparatus with a high performance is selected for the high-ranked data to be saved.

According to yet another embodiment of the invention, a program for a selection apparatus located between a plurality of host computers and a plurality of tape recording apparatuses, is provided the program causing the apparatus to perform the method above.

BRIEF DESCRIPTION OF THE SEVERAL VIEWS OF THE DRAWINGS

FIG. 1 shows an exemplary configuration of a system for selecting a destination of data to be saved out of a plurality of tape recording apparatuses.

FIG. 2 shows an exemplary functional configuration of a selection apparatus.

FIG. 3(a) shows an exemplary rank list of standard scores of data lengths.

FIG. 3(b) shows an exemplary rank list of occurrence probabilities of data lengths.

FIG. 4(a) shows an exemplary table that records performance information for each combination of a tape recording apparatus and a tape medium.

FIG. 4(b) shows an exemplary table that records various kinds of information about tape media.

FIG. 4(c) shows an exemplary table that records specification-based data transfer rates of the tape recording apparatuses.

FIG. 5(a) shows an exemplary performance rank list for the data transfer rate.

FIG. 5(b) shows an exemplary performance rank list for the success rate, which is a value of one minus the error incidence.

FIG. 5(c) shows an exemplary performance rank list for the product of the data transfer rate and the success rate.

FIG. 6 shows a flowchart of a process for selecting a destination of data to be saved out of a plurality of tape recording apparatuses by the selection apparatus.

FIG. 7 shows a flowchart of a rank determination process by a rank determination unit.

FIG. 8 shows a flowchart of a process of selecting a tape recording apparatus by a selection unit.

FIG. 9 shows an exemplary hardware configuration of the selection apparatus.

DETAILED DESCRIPTION

With reference now to FIG. 1, FIG. 1 shows a configuration of a system 10 for selecting a destination of data to be saved out of a plurality of tape recording apparatuses 100. System 10, upon a data write request from a host computer 500, allows a tape recording apparatus 100 to be selected depending on characteristics of data to be saved, thereby aiming to improve the efficiency of data backup in the plurality of tape recording apparatuses 100.

System 10 for selecting a destination of data to be saved out of the plurality of tape recording apparatuses 100 includes the plurality of tape recording apparatuses 100 that write data onto tape media 200, a selection apparatus 300 that selects a destination of data to be saved, and a plurality of host computers 500 that issue a data write request. Connections between tape recording apparatuses 100 and selection apparatus 300 and between selection apparatus 300 and host computers 500 are made over network 400 such as a SCSI interface or LAN (Local Area Network). Alternatively, connections between tape recording apparatuses 100 and selection apparatus 300 and between selection apparatus 300 host computers 500 may be made over network 400 such as a dedicated line or the Internet. Further, connections between tape recording apparatuses 100 and selection apparatus 300 may be made directly without a network therebetween.

Host computers 500 issue a data write request along with data to be saved. The data write request and the data to be saved are first received by selection apparatus 300. Upon receiving the data to be saved, selection apparatus 300 reads out history information about data lengths of past data saved in any of tape recording apparatuses 100 from a history information storage unit. Based on the history information, selection apparatus 300 determines a data length rank for the data to be saved.

Selection apparatus 300 then reads out a performance rank list for the tape recording apparatuses 100 from a rank list storage unit. Based on the performance rank list for tape recording apparatuses 100 and the determined data length rank, selection apparatus 300 selects a tape recording apparatus 100 for saving the data to be saved so that data saving in the plurality of tape recording apparatuses 100 is performed efficiently as a whole. Thereafter, selection apparatus 300 transfers the data to be saved and the data write request to selected tape recording apparatus 100. Tape recording apparatus 100, having received the data write request, writes the transferred data onto tape medium 200.

In this manner, when a data write request is made by host computer 500, selection apparatus 300 first receives this data write request and data. Selection apparatus 300 then evaluates characteristics about the data length of the data to be saved from the history information about previously backed-up data. Selection apparatus 300 selects a tape recording apparatus 100 whose performance is optimal for the data to be saved and transfers the data to this tape recording apparatus 100. Therefore, the data backup performance in the plurality of tape recording apparatuses 100 is improved.

FIG. 2 shows an exemplary functional configuration of selection apparatus 300. Selection apparatus 300 includes a data reception unit 310, a rank determination unit 320, a selection unit 330, and a transfer unit 340. Selection apparatus 300 further includes a history information storage unit 350, a computation unit 370, a performance information acquisition unit 380, a generation unit 390, and a rank list storage unit 360.

Data reception unit 310 receives a data write request and data from host computer 500. The data received by data reception unit 310 is passed to rank determination unit 320. At the same time, the data length of the data is stored in history information storage unit 350 as the history information about the data lengths of the past data saved in any of tape recording apparatuses 100.

Computation unit 370 reads out the history information about the data lengths from history information storage unit 350 and computers statistical data about the data lengths. Specifically, computation unit 370 computes the average and the standard deviation of the data lengths of the past data and stores this statistical data in the history information storage unit 350 as part of the history information. Computation unit 370 further determines the maximum and minimum of the data lengths from the history information about the data lengths of the past data. Computation unit 370 classifies the data lengths into a predetermined number of groups, for example ten groups based on the maximum and minimum and computes the occurrence probability of data having data lengths belonging to each group. The range of data lengths in each group is preferably based on the byte order (the number of digits) of the data lengths. This is because the digits of time required for data transfer increases as the digits of the data length increases. The data length is the data size, in other words. The statistical data about the occurrence probability of the data in each group is similarly stored in history information storage unit 350 as part of the history information.

Rank determination unit 320 reads out the history information about the data lengths of the past data from history information storage unit 350 and, based on the history information, determines a data length rank for the data received from data reception unit 310. The determined rank is passed to selection unit 330 along with the data to be saved. As an example, rank determination unit 320 ranks the received data high if the data length of the data is long compared with the past data. Whether the data length of the received data is long compared with the past data is determined as follows.

Rank determination unit 320 first reads out the average and the standard deviation from history information storage unit 350 and uses the average and the standard deviation to determine the standard score of the data length of the data received from data reception unit 310. Rank determination unit 320 evaluates the standard score, for example on a ten-grade scale of standard scores 75 to 25 as in a table shown in FIG. 3 $a$), so that a higher standard score is ranked higher.

As another example, rank determination unit 320 reads out the history information about the data lengths of the past data from history information storage unit 350. If the data received from data reception unit 310 can be judged to have a data length with a high occurrence probability from the history information, rank determination unit 320 ranks the data high. Whether the data has a data length with a high occurrence probability is determined as follows.

Rank determination unit 320 reads out the above-described occurrence probability for data in each group from history information storage unit 350 and gives a higher rank to a group with a higher occurrence probability as shown in FIG. 3 $b$). By finding a rank given to the group to which the data length of the data received from the data reception unit 310 belongs, rank determination unit 320 determines the rank based on the occurrence probability for the received data.

As a further example, rank determination unit 320 may determine, as the data length rank of the data to be saved, the higher one of the rank determined from the standard score of the data length of the data received from data reception unit 310 and the rank determined from the occurrence probability of the data length of the data received from data reception unit 310.

If priority based on a characteristic of the data to be saved such as emergency or importance can be attached to the data in host computer 500, rank determination unit 320 may change, based on the priority information attached to the data, the rank determined based on the standard score or the occurrence probability. Specifically, for data with high priority, rank determination unit 320 may change the rank determined based on the standard score or the occurrence probability to a higher rank depending on the level of the priority.

Rank list storage unit 360 stores the performance rank list for tape recording apparatuses 100. As an example, the performance rank list for tape recording apparatuses 100 is a performance rank list in terms of at least one of the data transfer rate (MByte/sec) of each tape recording apparatus 100 and the success rate (%), which is a value of one minus the error incidence (%) of each tape recording apparatus. Preferably, the performance rank list for tape recording apparatuses 100 is a performance rank list that lists the products of the data transfer rates of tape recording apparatuses 100 and the success rates of tape recording apparatuses 100 in descending order. In that case, a tape recording apparatus 100 with a higher success rate (i.e., a lower error incidence) and a higher data transfer rate is ranked higher. It is to be noted that a manager of tape recording apparatuses 100 may generate the performance rank list for tape recording apparatuses 100 by collecting information such as the data transfer rates and the error incidences and may input the performance rank list directly to selection apparatus 300. However, in this embodiment, description will be given for the case where the performance rank list for tape recording apparatuses 100 is automatically generated.

Performance information acquisition unit 380 acquires the error incidence and identification information about each tape recording apparatus 100 from each tape recording apparatus 100, and stores them in rank list storage unit 360 in correspondence with each other. Performance information acquisition unit 380 also acquires the data transfer rate and the identification information about each tape recording apparatus 100 from transfer unit 340 to be described later, and stores them in rank list storage unit 360 in correspondence with each other. The serial number of each tape recording apparatus 100 may be used as the identification information about tape recording apparatus 100, for example.

The data transfer rate of each tape recording apparatus 100 is defined by its specification, and the specification-based data transfer rate may be input directly to selection apparatus 300. Therefore, acquisition of the data transfer rate by performance information acquisition unit 380 may not be necessary. However, since the performance of each tape recording apparatus changes with time, it is preferable that performance information acquisition unit 380 regularly makes a request to acquire the value of the error incidence from each tape recording apparatus 100 and also acquire the data transfer rate when transfer unit 340 transfers data. The way transfer unit 340 measures the data transfer rate will be described later.

The error incidence of each tape recording apparatus 100 is the number of write errors relative to the number of times of writing a data unit, which is the unit of data writing to tape medium 200. The number of write errors may include the number of write retries. The error incidence may be determined from not only the write errors but also read errors. It is assumed that each tape recording apparatus 100 has a function of counting the number of error occurrences and the number of retries.

The data transfer rate and the error incidence also depend on tape medium 200 used. For example, if a foreign object such as dust is attached to part of the surface of tape medium 200 used, tape recording apparatus 100 using this tape medium 200 is influenced thereby to show a low performance. In addition, for tape media 200 in compliance with the LTO (Linear Tape Open) standard, a plurality of specifications exist such as the first generation, second generation, etc., each of which defining a different recording density and transfer rate. The LTO standard is an open-format standard cooperatively developed by three companies: Hewlett-Packard Company, International Business Machines Corporation, and Quantum Corporation.

Therefore, when acquiring the error incidence and the identification information about each tape recording apparatus 100 from each tape recording apparatus 100, performance information acquisition unit 380 preferably further acquires identification information about tape medium 200 being used and stores them in rank list storage unit 360 in correspondence with each other. Examples that can be used as the identification information about each tape medium 200 include a volume serial number (VOLSER) available from a barcode label adhered to the case of tape medium 200, and a cartridge serial number recorded in a specific area on a cartridge memory provided in a cartridge case or in a specific area on tape medium 200.

FIG. 4 *a*) shows an exemplary table indicating the above-described correspondence. The table shown in FIG. 4 *a*) records the data transfer rate, error incidence, and current usage status for each combination of a tape recording apparatus 100 and a tape medium 200. Upon acquiring the data transfer rate and the identification information about a tape recording apparatus 100 from transfer unit 340, performance information acquisition unit 380 determines which tape medium 200 was used in combination with tape recording apparatus 100 having that identification information for the last updated data. Performance information acquisition unit 380 updates the data transfer rate for that combination to the acquired data transfer rate.

Here, consideration will be given for the case where a currently used tape medium 200 is replaced with a tape medium 200 having no usage history information. Since the information such as the data transfer rate and the error incidence is determined from the past usage history information, performance information acquisition unit 380 cannot readily acquire the information about the data transfer rate and the error incidence in this case. One measure for the absence of the history information is to use, as initial values, information about a tape medium 200 of the same type as tape medium 200 having no usage history information. However, if tape medium 200 of the same type has its unique defect, the use of its information is not appropriate.

Therefore, in addition to the identification information about tape medium 200 being used, performance information acquisition unit 380 preferably receives information about the type and defects of tape medium 200 from each tape recording apparatus 100 and stores them in rank list storage unit 360 in correspondence with each other. The information about the type and defects of tape medium 200 can be acquired from the aforementioned specific area on the cartridge memory or the tape medium 200. FIG. 4 b) shows an exemplary table indicating this correspondence. The table shown in FIG. 4 b) records the standard, type, and presence or absence of defects for each tape medium 200. A table shown in FIG. 4 c) that records the specification-based transfer rate of each tape recording apparatus 100 is also provided. When a tape medium 200 having no usage history information is to be used, the table shown in FIG. 4 b) is first searched for a tape medium 200 of the same standard and type.

If a matching tape medium 200 exists and it has no defective area, the data transfer rate and the error incidence for the combination of the matching tape medium 200 and tape recording apparatus 100 in question for which tape medium 200 is changed are used as initial values of the data transfer rate and the error incidence for the combination of tape medium 200 having no usage history information and tape recording apparatus 100 in question. If a matching tape medium 200 exists but it has a defective area, or if no matching tape medium 200 exists, the initial values of the data transfer rate and the error incidence for the combination of tape medium 200 having no usage history information and tape recording apparatus 100 in question are set as follows, for example: the specification-based data transfer rate of tape recording apparatus 100 in question shown in FIG. 4 c) is used, and the error incidence is assumed to be zero. Notification of changing tape medium 200 is provided to selection apparatus 300 from tape recording apparatus 100 for which the changing is performed, and performance information acquisition unit 380 obtains the notification.

An exemplary way of discovering the aforementioned defect unique to a tape medium 200 is to determine that the tape medium 200 has a defect if a write error occurs in a tape recording apparatus 100 and an error occurs again when the same data is written to an area different from the area where the first error has occurred. Another way is to use the same tape medium 200 in different tape recording apparatuses 100 and determine that tape medium 200 has a defect if the same error occurs in the different tape recording apparatuses 100. Thus, a number of techniques for determining the cause of an error exist. These techniques are well known to those of ordinary skill in the art.

Generation unit 390 generates the above-described performance rank list to be stored in rank list storage unit 360 based on the information acquired by performance information acquisition unit 380. To explain according to the above-described specific example, generation unit 390 reads out the table shown in FIG. 4 a) from rank list storage unit 360 and retrieves data transfer rates and error incidences for combinations of tape media 200 and tape recording apparatuses 100 for which the usage status indicates "used". The data transfer rates and the error incidences are retrieved in correspondence with the respective tape recording apparatuses 100. Generation unit 390 generates the performance rank list by sorting tape recording apparatuses 100 based on at least one of the data transfer rate and the success rate, which is a value of one minus the error incidence.

If the data transfer rate is used, as shown in FIG. 5 a), generation unit 390 generates a performance rank list in which a tape recording apparatus 100 with a higher data transfer rate is ranked higher. If the success rate is used, as shown in FIG. 5 b), generation unit 390 generates a performance rank list in which a tape recording apparatus 100 with a higher success rate, i.e., a lower error incidence, is ranked higher. Preferably, generation unit 390 determines the product of the data transfer rate and the success rate for each tape recording apparatus 100. Then, as shown in FIG. 5 c), generation unit 390 generates a performance rank list in which the larger the determined product is, the higher the rank is. The performance rank list generated by generation unit 390 is preferably updated regularly as performance information acquisition unit 380 collects data, and also updated in response to performance information acquisition unit 380 receiving the notification of changing tape medium 200.

Selection unit 330 selects a tape recording apparatus 100 for saving the data to be saved based on the performance rank list read out from rank list storage unit 360 and data length rank determined by rank determination unit 320 so that data saving in the plurality of tape recording apparatuses 100 is efficiently performed as a whole. That is, for highly ranked data to be saved, selection unit 330 selects a tape recording apparatus 100 with a high performance.

As a specific example, consideration will be given for the case where the data length rank of the data to be saved is evaluated as any of ten ranks. Selection unit 330 first acquires the number M of tape recording apparatuses 100 being used, i.e., connected to selection apparatus 300. For example, the number M of tape recording apparatuses 100 being used can be acquired from the lowest rank in the performance rank list. The rank S of a tape recording apparatus 100 with performance corresponding to the rank A is determined by the following equation, where A denotes the data length rank determined by the rank determination unit 320.

$$S = [(A-1) \times M/10] + 1 \qquad \text{(Formula 1)}$$

If the tape recording apparatus 100 of the rank S is available, selection unit 330 determines to select the tape recording apparatus 100 of the rank S. If the tape recording apparatus 100 of the rank S is currently writing or reading data under another instruction, selection unit 330 selects a tape recording apparatus 100 of a rank higher than the rank S. If a tape recording apparatus 100 of a rank higher than the rank S does not exist, selection unit 330 selects a tape recording apparatus 100 of a rank lower than the rank S. For the availability of tape recording apparatuses 100, selection unit 330 queries transfer unit 340.

Transfer unit 340 receives the data to be saved and the result of selection by selection unit 330 from selection unit 330 and transfers the data to be saved to tape recording apparatus 100 selected by selection unit 330. In transferring the data to tape recording apparatus 100, transfer unit 340 also measures the data transfer rate. Specifically, transfer unit 340 measures a predetermined time from the start of the data transfer and determines the data transfer rate from the number of bytes of data transferred during that period. Transfer unit 340 passes the determined data transfer rate to performance information acquisition unit 380 along with the identification information about tape recording apparatus 100. Further, transfer unit 340 holds therein a table indicating the availability of tape recording apparatuses 100 connected to selection apparatus 300. For a query about the availability of a tape recording apparatus 100 from selection unit 330, transfer unit 340 returns a response indicating whether tape recording apparatus 100 is currently writing or reading data.

Thus, as described above, rank determination unit 320 ranks the data high if the data length of the data is long compared with the past data. Generation unit 390 generates the performance rank list by sorting tape recording apparatuses 100 based on at least one of the data transfer rate and the success rate. Therefore, long data compared with the past data is transferred to a tape recording apparatus 100 with a high data transfer rate and/or with a high success rate, i.e., a low error incidence. Short data compared with the past data is transferred to a tape recording apparatus 100 with a low data transfer rate and/or with a low success rate, i.e., a high error incidence. As a result, data saving in the plurality of tape recording apparatuses 100 is efficiently performed as a whole.

As another example, if the data received from data reception unit 310 can be judged to have a data length with a high occurrence probability from the history information about the data lengths of the past data, rank determination unit 320 ranks the data high. Generation unit 390 generates the performance rank list by sorting tape recording apparatuses 100 based on at least one of the data transfer rate and the success rate. Therefore, data with a high occurrence probability compared with the past data is transferred to a tape recording apparatus 100 with a high data transfer rate and/or with a high success rate, i.e., a low error incidence. Data with a low occurrence probability compared with the past data is transferred to a tape recording apparatus 100 with a low data transfer rate and/or with a low success rate, i.e., a high error incidence. As a result, data saving in the plurality of tape recording apparatuses 100 is efficiently performed as a whole.

As yet another example, rank determination unit 320 determines, as the data length rank of the data to be saved, the higher one of the rank determined from the standard score of the data length of the data received from data reception unit 310 and the rank determined from the occurrence probability of the data length of the data received from data reception unit 310. As a result, for example, although data of a short data length is ranked low according to the standard score of the data length, the data of the short data length is ranked high if the occurrence probability is high, so that the higher rank is adopted. Generation unit 390 generates the performance rank list by sorting tape recording apparatuses 100 based on at least one of the data transfer rate and the success rate. Therefore, data of a data length with a high occurrence probability, even if the data length is short, is transferred to a tape recording apparatus 100 with a high data transfer rate and/or with a high success rate, i.e., a low error incidence. As a result, the characteristics of the data length of the data to be saved are more accurately evaluated.

As a further example, if priority based on a characteristic of the data to be saved such as emergency or importance is attached to the data, rank determination unit 320 changes, based on the priority information attached to the data, the rank determined based on the standard score or the occurrence probability. The generation unit 390 generates the performance rank list by sorting the tape recording apparatuses 100 based on at least one of the data transfer rate and the success rate. Therefore, even if the rank determined based on the standard score or the occurrence probability is low, data with high priority is transferred to a tape recording apparatus 100 whose performance is suitable for the priority. As a result, a characteristic of the data to be saved other than the data length is also appropriately evaluated.

Thus, in selecting a destination tape recording apparatus 100 for saving data, selection apparatus 300 according to the embodiment of the present invention evaluates the characteristics about the data length of the data to be saved based on the history information about the previously backed-up data, and selects a tape recording apparatus 100 whose performance is optimal for the data to be saved. This allows improvement of the data backup performance in the plurality of tape recording apparatuses 100.

Now, with reference to flowcharts in FIGS. 6, 7 and 8, operation of selection apparatus 300 according to this embodiment will be described. Processing starts in step 100 in FIG. 6, where data reception unit 310 receives a data write request and data to be written from one of host computers 500. Data reception unit 310 passes the received data to rank determination unit 320. Rank determination unit 320 reads out, from history information storage unit 350, the history information about the data lengths of the past data saved in any of tape recording apparatuses 100 (step 110). Collection of the history information and the statistical data to be stored in history information storage unit 350 has been described in connection with the functional block diagram in FIG. 2.

The processing proceeds to step 120, where, based on the history information about the data lengths of the past data, rank determination unit 320 determines the data length rank for the data to be saved. Details of the rank determination by rank determination unit 320 will be described later with reference to a flowchart in FIG. 7. The rank determined by rank determination unit 320 and the data to be saved are then passed to selection unit 330. Selection unit 330 reads out the performance rank list for the tape recording apparatuses from rank list storage unit 360 (step 130).

The processing proceeds to step 140, where, based on the performance rank list for tape recording apparatuses 100 and the determined data length rank, selection unit 330 selects a tape recording apparatus 100 for saving the data to be saved so that data saving in the plurality of tape recording apparatuses 100 is efficiently performed as a whole. Details of the selection of the tape recording apparatus 100 by the selection unit 330 will be described later with reference to a flowchart in FIG. 8. In step 150, transfer unit 340 transfers the data to be saved to tape recording apparatus 100 selected by selection unit 330, and the processing terminates.

FIG. 7 shows a flowchart of the determination of the data length rank by rank determination unit 320. Processing starts in step 200 in FIG. 7, where the rank determination unit 320 reads out the average and the standard deviation of the data lengths of the past data from history information storage unit 350. Rank determination unit 320 computes the standard score of the data length of the data passed from data reception unit 310. Rank determination unit 320 evaluates the determined standard score on a ten-grade scale of standard scores 75 to 25 and determines a rank L based on the standard score for the data so that a higher standard score is ranked higher (step 210).

Next, from history information storage unit 350, rank determination unit 320 reads out the occurrence probability of data in each of the groups defined by dividing the range from the maximum to the minimum of the data lengths of the past data into a predetermined number. Rank determination unit 320 then determines the rank of each group by sorting the occurrence probabilities in descending order so that a group with a higher occurrence probability is ranked higher (step 220). Rank determination unit 320 determines a rank P based on the occurrence probability, which is the rank given to the group to which the data length of the data passed from data reception unit 310 belongs (step 230). Finally, rank determination unit 320 determines the maximum MAX (L,P) of the standard score rank L and the occurrence probability rank P, and sets this as the data length rank A of the data to be saved (step 240). Then, the rank determination processing by rank determination unit 320 terminates.

FIG. 8 shows a flowchart of the selection of tape recording apparatus 100 by selection unit 330. Processing starts in step 300 in FIG. 8, where selection unit 330 reads out the performance rank list for tape recording apparatuses 100 from rank list storage unit 360. Selection unit 330 also acquires the number M of tape recording apparatuses being used among tape recording apparatuses 100 (step 310). Based on the above-described formula 1, selection unit 330 determines the rank S corresponding to the data length rank A of the data to be saved. Selection unit 330 searches the performance rank list for a tape recording apparatus 100 of the rank S and selects that tape recording apparatus 100 (step 320). At this point, an initial value 0 is assigned to a variable i serving as a counter.

The processing proceeds to step 330, where selection unit 330 determines whether tape recording apparatus 100 of the rank S is currently in the execution of data writing or reading. If tape recording apparatus 100 of the rank S is currently not in the execution (step 330: NO), the processing of selecting the tape recording apparatus 100 by the selection unit 330 terminates. If tape recording apparatus 100 of the rank S is currently in the execution (step 330: YES), selection unit 330 increments the value of S by one and determines whether a tape recording apparatus 100 of the one-rank higher S exists (step 340). At this point, the value of i is incremented by one. If a tape recording apparatus 100 of the one-rank higher S exists (step 340: YES), selection unit 330 selects tape recording apparatus 100 of the rank S and returns to step 330 (step 350). The sequential processing from step 330 to step 350 is repeated until a higher-rank tape recording apparatus 100 not in the execution of data writing or reading is found, or until no more higher-rank tape recording apparatuses 100 exist.

If step 340 results in NO, that is, if no more higher-rank tape recording apparatuses 100 exist, selection unit 330 obtains the initially determined rank S by determining the value of S minus i (step 360). At this point, i is reset and assigned 0. Selection unit 330 decrements the value of S by one and determines whether a tape recording apparatus 100 of the one-rank lower S exists (step 370). At this point, the value of i is incremented by one. If a tape recording apparatus 100 of the one-rank lower S exists (step 370: YES), selection unit 330 selects tape recording apparatus 100 of the rank S (step 380). Selection unit 330 determines whether tape recording apparatus 100 of the rank S is currently in the execution (step 390). If tape recording apparatus 100 of the rank S is not currently in the execution (step 390: NO), the processing of selecting tape recording apparatus 100 by selection unit 330 terminates.

If step 390 results in YES, the processing returns to step 370, where the sequential processing from step 370 to step 390 is repeated until a lower-rank tape recording apparatus 100 not in the execution of data writing or reading is found, or until no more lower-rank tape recording apparatuses 100 exist. If step 370 results in NO, that is, if no more lower-rank tape recording apparatuses 100 exist, selection unit 330 obtains the initially determined rank S by determining the value of S plus i (step 400). At this point, i is reset and assigned 0. The processing returns to step 330, where the sequential processing is repeated.

FIG. 9 shows an exemplary hardware configuration of selection apparatus 300 according to this embodiment. Selection apparatus 300 includes a CPU peripheral section including a CPU 700 and a RAM 720, which are interconnected via a host controller 710. Selection apparatus 300 also includes an I/O section including a communication interface 760, a hard disk drive 740, and a CD-ROM drive 750, which are connected to host controller 710 via an I/O controller 730. Selection apparatus 300 also includes a legacy I/O section including a super I/O controller 770 and a flexible disk drive 780 connected to super I/O controller 770, a flash ROM 790, and a keyboard/mouse controller 800, which are connected to I/O controller 730.

Host controller 710 connects RAM 720 with CPU 700 that access RAM 720 at high transfer rates. CPU 700 operates according to programs stored in a hard disk and controls various components. A program for the selection apparatus according to the present invention for selecting a destination of data to be saved out of a plurality of tape recording apparatuses 100 is stored in the hard disk and executed by CPU 700 using RAM 720. The program for selection apparatus 300 causes selection apparatus 300 to function as data reception unit 310, rank determination unit 320, selection unit 330, transfer unit 340, history information storage unit 350, rank list storage unit 360, computation unit 370, performance information acquisition unit 380, and generation unit 390. Their detailed functions and operation are described above with reference to FIG. 2 through.

I/O controller 730 connects host controller 710 with communication interface 760, hard disk drive 740, and CD-ROM drive 750, which are relatively fast I/O devices. Communication interface 760 communicates with external apparatuses such as tape reading apparatuses 100 and the host computers over a network. The history information and the statistical data about the data lengths of the past data saved in any of tape recording apparatuses 100, and the performance information about tape recording apparatuses 100 and their rank list may be stored in the hard disk drive of hard disk drive 740 and/or a CD-ROM of CD-ROM drive 750, or in an external storage device connected via communication interface 760.

Connected to I/O controller 730 are relatively slow I/O devices including flexible disk drive 780 and keyboard/mouse controller 800, and flash ROM 790. Flash ROM 790 stores programs such as a boot program executed by CPU 700 at startup of selection apparatus 300 and programs dependent on the hardware of selection apparatus 300. Flexible disk drive 780 reads a program or data from a flexible disk and provides it to super I/O controller 770 via RAM 720. Super I/O controller 770 connects the flexible disk and also connects various I/O devices via ports, for example a parallel port, serial port, keyboard port, and mouse port. The values in the tables in FIGS. 3 and 4, for example the specification-based data transfer rate of each tape recording apparatus 100, may be directly input to selection apparatus 300. In that case, various I/O devices via ports such as the keyboard port and mouse port may be used.

While the present invention has been described with respect to its embodiment, the technical scope of the present invention is not limited to the scope described in the above embodiment. For example, in the above embodiment, the present invention is implemented in selection apparatus 300 located between the plurality of tape recording apparatuses 100 and the plurality of host computers 500. However, in an environment in which a single host computer 500 uses the plurality of tape recording apparatuses 100, the present invention may be implemented in the single host computer 500. Thus, it is apparent to those skilled in the art that various modifications or improvements may be made to the above embodiment. Therefore, embodiments with such modifications or improvements naturally fall within the technical scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A selection apparatus that selects a destination of data to be saved out of a plurality of tape recording apparatuses, comprising:
    a history information storage unit that stores history information about data lengths of past data saved in any of the plurality of tape recording apparatuses;
    a rank determination unit that determines a data length rank for the data to be saved based on the history information about the data lengths of the past data read out from the history information storage unit;
    a rank list storage unit that stores a performance rank list for the plurality of tape recording apparatuses;
    a selection unit that selects a tape recording apparatus for saving the data to be saved out of the plurality of tape recording apparatuses based on the performance rank list read out from the rank list storage unit and the data length rank determined by the rank determination unit so that data saving in the plurality of tape recording apparatuses is performed efficiently as a whole; and
    a transfer unit that transfers the data to be saved to the tape recording apparatus selected by the selection unit, wherein the rank determination unit ranks the data to be saved high if the data to be saved is judged to have a data length occurring frequently from the history information, and the selection unit selects a tape recording apparatus with a high performance for the high-ranked data to be saved.

2. The selection apparatus according to claim 1, wherein the performance rank list for the plurality of tape recording apparatuses is a performance rank list in terms of at least one of a data transfer rate of each tape recording apparatus and a success rate, which is a value of one minus an error incidence of each tape recording apparatus.

3. The selection apparatus according to claim 1, wherein the performance rank list for the plurality of tape recording apparatuses is a performance rank list based on the product of a data transfer rate of each tape recording apparatus and a success rate, which is a value one minus an error incidence of each tape recording apparatus.

4. The selection apparatus according to claim 1, wherein the performance rank list for the plurality of tape recording apparatuses is updated regularly or in response to changing a tape medium.

5. The selection apparatus according to claim 1, further comprising:
    a performance information acquisition unit that acquires at least one of the data transfer rate and the error incidence in association with identification information about each tape recording apparatus; and
    a generation unit that generates the performance rank list based on the information acquired by the performance information acquisition unit.

6. The selection apparatus according to claim 1, wherein
    the selection apparatus is connected to a plurality of host computers over a network, and
    the selection apparatus further comprises a data reception unit that receives a data write request issued from the plurality of host computers to the plurality of tape recording apparatuses and the data to be saved.

7. A selection apparatus that selects a destination of data to be saved out of a plurality of tape recording apparatuses, comprising:
    a history information storage unit that stores history information about data lengths of past data saved in any of the plurality of tape recording apparatuses;
    a rank determination unit that determines a data length rank for the data to be saved based on the history information about the data lengths of the past data read out from the history information storage unit;
    a rank list storage unit that stores a performance rank list for the plurality of tape recording apparatuses;
    a selection unit that selects a tape recording apparatus for saving the data to be saved out of the plurality of tape recording apparatuses based on the performance rank list read out from the rank list storage unit and the data length rank determined by the rank determination unit so that data saving in the plurality of tape recording apparatuses is performed efficiently as a whole; and
    a transfer unit that transfers the data to be saved to the tape recording apparatus selected by the selection unit, wherein the rank determination unit determines a rank determined from the standard score of the data length of the data to be saved and a rank determined from the occurrence probability of the data length of the data to be saved, and identifies the higher rank as the data length rank of the data to be saved.

8. The selection apparatus according to claim 7, wherein the performance rank list for the plurality of tape recording apparatuses is a performance rank list in terms of at least one of a data transfer rate of each tape recording apparatus and a success rate, which is a value of one minus an error incidence of each tape recording apparatus.

9. The selection apparatus according to claim 7, wherein the performance rank list for the plurality of tape recording apparatuses is a performance rank list based on the product of a data transfer rate of each tape recording apparatus and a success rate, which is a value one minus an error incidence of each tape recording apparatus.

10. The selection apparatus according to claim 7, wherein the performance rank list for the plurality of tape recording apparatuses is updated regularly or in response to changing a tape medium.

11. The selection apparatus according to claim 7, further comprising:
    a performance information acquisition unit that acquires at least one of the data transfer rate and the error incidence in association with identification information about each tape recording apparatus; and
    a generation unit that generates the performance rank list based on the information acquired by the performance information acquisition unit.

12. The selection apparatus according to claim 7, wherein
    the selection apparatus is connected to a plurality of host computers over a network, and
    the selection apparatus further comprises a data reception unit that receives a data write request issued from the plurality of host computers to the plurality of tape recording apparatuses and the data to be saved.

13. A method of selecting a destination of data to be saved out of a plurality of tape recording apparatuses in a selection apparatus located between a plurality of host computers and the plurality of tape recording apparatuses, comprising:
receiving the data to be saved from one of the plurality of host computers;
reading out history information about data lengths of past data saved in any of the plurality of tape recording apparatuses from a history information storage unit;
determining a data length rank for the data to be saved based on the history information about the data lengths of the past data;
reading out a performance rank list for the plurality of tape recording apparatuses from a rank list storage unit;
selecting a tape recording apparatus for saving the data to be saved out of the plurality of tape recording apparatuses based on the performance rank list for the plurality of tape recording apparatuses and the determined data length rank so that data saving in the plurality of tape recording apparatuses is performed efficiently as a whole; and
transferring the data to be saved to the selected tape recording apparatus, wherein the data to be saved is ranked high if the data to be saved is judged to have a data length occurring frequently from the history information, and a tape recording apparatus with a high performance is selected for the high-ranked data to be saved.

14. The method according to claim 13, wherein the performance rank list for the plurality of tape recording apparatuses is a performance rank list in terms of at least one of a data transfer rate of each tape recording apparatus and a success rate, which is a value of one minus an error incidence of each tape recording apparatus.

15. The method according to claim 13, wherein the performance rank list for the plurality of tape recording apparatuses is a performance rank list based on the product of a data transfer rate of each tape recording apparatus and a success rate, which is a value one minus an error incidence of each tape recording apparatus.

16. The method according to claim 13, further comprising updating the performance rank list for the plurality of tape recording apparatuses regularly or in response to changing a tape medium.

17. The method according to claim 13, further comprising:
acquiring at least one of the data transfer rate and the error incidence in association with identification information about each tape recording apparatus; and
generating the performance rank list based on the information acquired by the performance information acquisition unit.

18. A non-transitory computer program product for a selection apparatus located between a plurality of host computers and a plurality of tape recording apparatuses, the program for causing the apparatus to perform, comprising:
receiving data to be saved from one of the plurality of host computers;
reading out history information about data lengths of past data saved in any of the plurality of tape recording apparatuses from a history information storage unit;
determining a data length rank for the data to be saved based on the history information about the data lengths of the past data;
reading out a performance rank list for the plurality of tape recording apparatuses from a rank list storage unit;
selecting a tape recording apparatus for saving the data to be saved out of the plurality of tape recording apparatuses based on the performance rank list for the plurality of tape recording apparatuses and the determined data length rank so that data saving in the plurality of tape recording apparatuses is performed efficiently as a whole; and
transferring the data to be saved to the selected tape recording apparatus, wherein the data to be saved is ranked high if the data to be saved is judged to have a data length occurring frequently from the history information, and a tape recording apparatus with a high performance is selected for the high-ranked data to be saved.

* * * * *